United States Patent
Ghannam et al.

(10) Patent No.: US 10,703,340 B2
(45) Date of Patent: Jul. 7, 2020

(54) SENSOR CLEANING SYSTEM

(71) Applicant: Ford Global Technologies, LLC, Dearborn, MI (US)

(72) Inventors: Mahmoud Yousef Ghannam, Canton, MI (US); Venkatesh Krishnan, Canton, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/887,251

(22) Filed: Feb. 2, 2018

(65) Prior Publication Data

US 2019/0241158 A1 Aug. 8, 2019

(51) Int. Cl.
*B60S 1/46* (2006.01)
*B60S 1/56* (2006.01)
*B60S 1/08* (2006.01)
*G05D 1/02* (2020.01)

(52) U.S. Cl.
CPC .... *B60S 1/46* (2013.01); *B60S 1/56* (2013.01); *G05D 1/0238* (2013.01); *B60S 1/0844* (2013.01); *B60Y 2400/3015* (2013.01)

(58) Field of Classification Search
CPC . B60S 1/56; B60S 1/46; B60S 1/0844; G05D 1/0238; B60Y 2400/3015
See application file for complete search history.

(56) References Cited

U.S. PATENT DOCUMENTS

| | | | |
|---|---|---|---|
| 9,045,112 B2 | 6/2015 | Kracker et al. | |
| 9,676,387 B2 | 6/2017 | Prokhorov et al. | |
| 9,707,896 B2 | 7/2017 | Boegel et al. | |
| 9,771,071 B2 | 9/2017 | Hassani et al. | |
| 10,061,312 B1* | 8/2018 | Anderson | G05D 1/0255 |
| 10,173,646 B1* | 1/2019 | Rice | B60S 1/56 |
| 2008/0127441 A1* | 6/2008 | Inoue | B60S 1/522 15/250.04 |
| 2010/0222954 A1* | 9/2010 | Ichinose | G05D 1/024 701/26 |
| 2011/0166746 A1* | 7/2011 | Breuer | B60T 7/22 701/29.2 |
| 2013/0092758 A1 | 4/2013 | Tanaka | |
| 2015/0161523 A1* | 6/2015 | Antonov | G06F 16/285 706/12 |
| 2018/0290631 A1* | 10/2018 | Rice | B60S 1/481 |

(Continued)

FOREIGN PATENT DOCUMENTS

| | | |
|---|---|---|
| DE | 102009055190 A1 | 6/2011 |
| DE | 102016005618 A1 | 2/2017 |

(Continued)

OTHER PUBLICATIONS

Toyota, JP2008137548 (translation).*

(Continued)

*Primary Examiner* — Hussein Elchanti
(74) *Attorney, Agent, or Firm* — Frank A. MacKenzie; Bejin Bieneman PLC (57) ABSTRACT

A system includes a processor and a memory. The memory stores instructions executable by the processor to detect an object exterior to a vehicle, and to actuate a fluid dispenser device based on an opacity of a window and a location of the detected object.

17 Claims, 6 Drawing Sheets

(56) References Cited

U.S. PATENT DOCUMENTS

2019/0283533 A1* 9/2019 Lombrozo ................ G01L 7/20
2019/0322245 A1* 10/2019 Kline .................... B60S 1/0848

FOREIGN PATENT DOCUMENTS

| JP | 2008137548 A | 6/2008 |
| JP | 5081661 B2 | 11/2012 |
| JP | 2014037239 A | 2/2014 |

OTHER PUBLICATIONS

Combined Search and Examination Report from United Kingdom Intellectual Property Office (UKIPO) dated Jul. 24, 2019 regarding Application No. GB1901309.3 (6 pages).

* cited by examiner

SENSOR CLEANING SYSTEM

BACKGROUND

A vehicle may include one or more object detection sensors such as Light Detection and Ranging (LIDAR) sensors to detect objects, e.g., in an area outside the vehicle. A sensor for detecting objects outside a vehicle may be mounted to a vehicle exterior. For example, a sensor may be mounted to a vehicle roof, pillar, etc. A sensor such as a LIDAR sensor is typically subject to environmental conditions, e.g., dirt, dust, etc., that can impair or prevent operation of the sensor.

DETAILED DESCRIPTION

Introduction

Disclosed herein is a system including a processor and a memory. The memory stores instructions executable by the processor to detect an object exterior to a vehicle, and actuate a fluid dispenser device based on an opacity of a window and a location of the detected object.

The detected object may be a pedestrian.

The window may be a vehicle sensor window.

The instructions may include further instructions to actuate the fluid dispenser upon determining that the opacity of the window exceeds a first threshold.

The instructions may include further instructions to ignore the location of the detected object upon determining that the opacity of the window exceeds a second threshold greater than the first threshold.

The instructions may include further instructions to actuate the fluid dispenser upon determining that the location of the detected object is outside a splash zone of fluid dispenser, wherein the splash zone is an area in the exterior of the vehicle that is sprayed by a dispenser liquid fluid upon actuation of the fluid dispenser.

The instructions may include further instructions to determine an adjusted splash zone based on a wind intensity and a wind direction, and actuate the fluid dispenser upon determining that the detected object is outside the adjusted splash zone.

The instructions may include further instructions to actuate the fluid dispenser to output only air upon determining that the location of the detected object is within the splash zone.

The instructions may include further instructions to determine an adjusted splash zone of the fluid dispenser based on the location of the detected object, wherein the location of the detected object is outside the adjusted splash zone, and to actuate the fluid dispenser to operate according to the adjusted splash zone.

The instructions may include further instructions to, upon determining that the opacity of the window exceeds a first threshold, determine a delay time based on at least one of the location of the detected object, a vehicle speed, and a vehicle movement direction, and to actuate the fluid dispenser after the determined delay time has ended.

The instructions may include further instructions to actuate the fluid dispenser without waiting for the determined delay time to end, only upon determining that the opacity exceeds a second threshold greater than the first threshold.

The instructions may include further instructions to actuate the vehicle to platoon with a second vehicle upon determining that the opacity of the window exceeds a threshold and that the location of the detected object is within a splash zone of the fluid dispenser, and to navigate the vehicle at least in part based on data received from the second vehicle.

Further disclosed herein is a method including detecting an object exterior to a vehicle, and actuating a fluid dispenser device based on an opacity of a window and a location of the detected object.

The detected object may be a pedestrian.

The method may further include actuating the fluid dispenser upon determining that the opacity of the window exceeds a first threshold.

The method may further include actuating the fluid dispenser upon determining that the location of the detected object is outside a splash zone of fluid dispenser, wherein the splash zone is an area in the exterior of the vehicle that is sprayed by a dispenser liquid fluid upon actuation of the fluid dispenser.

The method may further include determining an adjusted splash zone based on a wind intensity and a wind direction, and actuating the fluid dispenser upon determining that the detected object is outside the adjusted splash zone.

The method may further include determining an adjusted splash zone of the fluid dispenser based on the location of the detected object, wherein the location of the detected object is outside the adjusted splash zone, and actuating the fluid dispenser to operate according to the adjusted splash zone.

The method may further include, upon determining that the opacity of the window exceeds a first threshold, determining a delay time based on at least one of the location of the detected object, a vehicle speed, and a vehicle movement direction, and actuating the fluid dispenser after the determined delay time has ended.

The method may further include actuating the vehicle to platoon with a second vehicle upon determining that the opacity of the window exceeds a threshold and that the location of the detected object is within a splash zone of the fluid dispenser, and navigating the vehicle at least in part based on data received from the second vehicle.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

Figure 1:
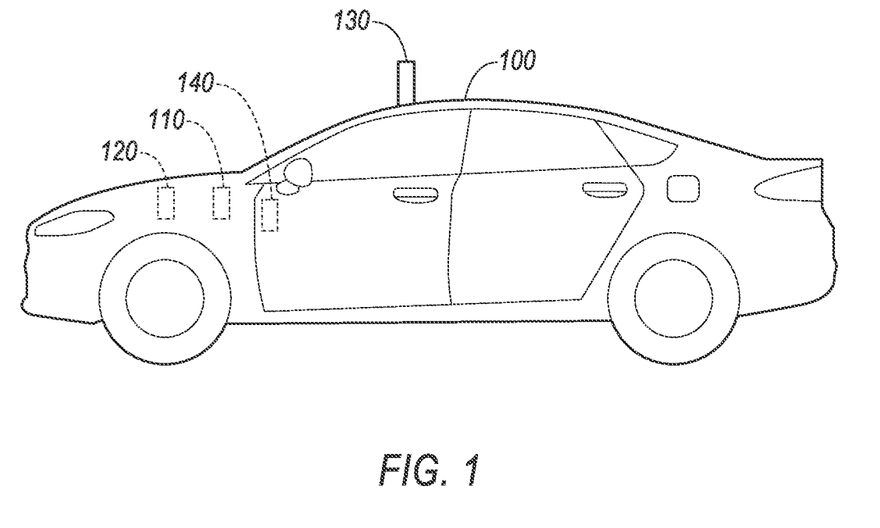
FIG. 1 is a diagram illustrating an example vehicle with an example sensor assembly.

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140. The vehicle may include a reference point 160, e.g., a center point which is a cross point of vehicle 100 longitudinal and lateral axes.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as is known. A LIDAR sensor 130 disposed, e.g., on a roof, pillar, etc., of the vehicle 100, may provide object data including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data.

The HMI 140 may be configured to receive user input, e.g., during operation of the vehicle 100. For example, a user may select a mode of operation, e.g., an autonomous mode, by inputting a requested mode of operation via a HMI 140. Moreover, a HMI 140 may be configured to present information to the user. Thus, a HMI 140 may be located in a passenger compartment of the vehicle 100. In an example, the computer 110 may output information indicating that a vehicle 100 mode of operation such as an autonomous mode is deactivated due to an event, e.g., a LIDAR sensor 130 sensor blockage that impairs its object detection operation.

In addition, the computer 110 may be configured for communicating through a vehicle to vehicle (V-to-V) communication interface with other vehicles 100, and/or a remote computer. The network represents one or more mechanisms by which the computer 110 and the remote computer may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

Figure 2:
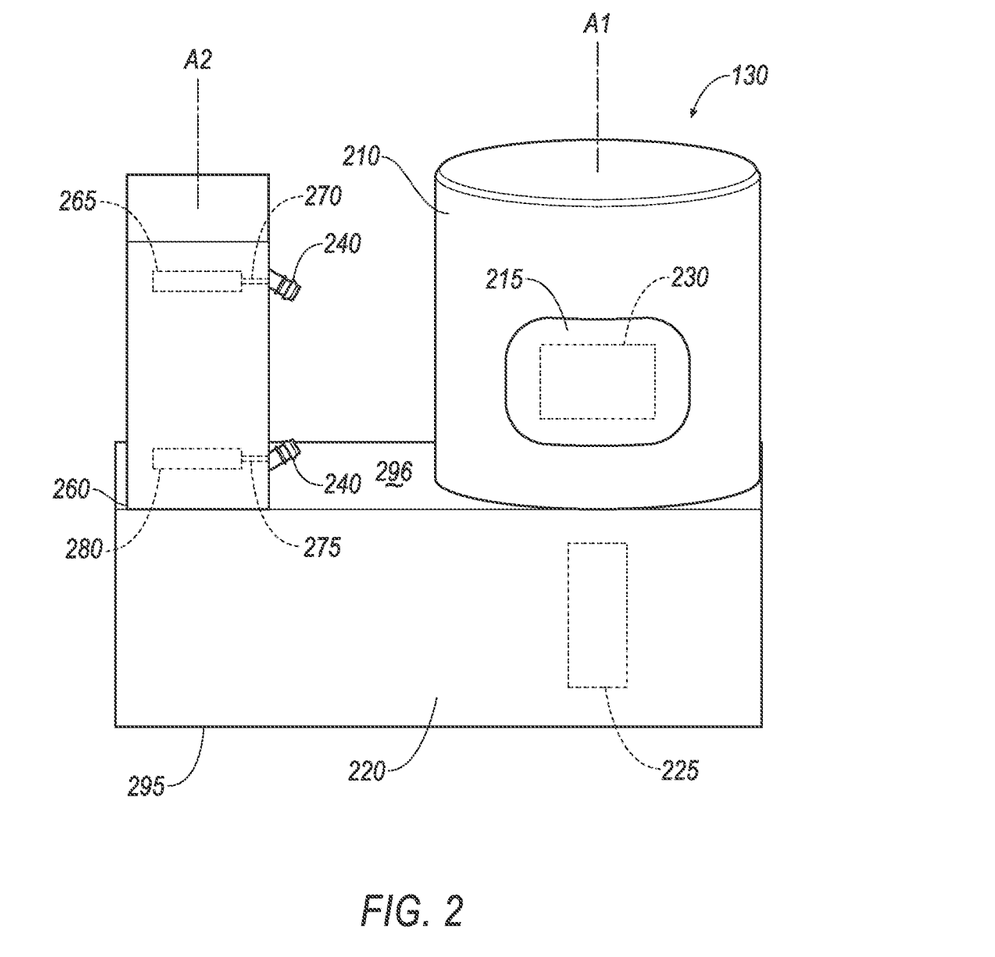
FIG. 2 is a diagram showing a side view of the example sensor assembly with fluid dispensers.

FIG. 2 shows an example LIDAR sensor 130 including a base 220, an excitation source 230, and a cover 210 having a window 215. The excitation source 230 may transmit an electro-magnetic beam such as a laser beam through the window 215 to an area surrounding the LIDAR sensor 130. The LIDAR sensor 130 may include a receiver that receives reflections of the transmitted electro-magnetic beams. The cover 210 may be formed of plastic, metal, etc. The cover 210 may protect the excitation source and/or other electronic components from environmental influences such as dirt, dust, rain, wind, etc. The window 215 may have a flat, round, etc. shape. The windows 215 may be formed of glass, plastic, etc. The window(s) 215 may include a lens, e.g., to focus electro-magnetic beams. The base 220 may have a bottom 295, a top 296, side, and edge surfaces (not numbered). The cover 210 may be mounted to the base 220 top 296. A LIDAR sensor 130 may include a rotational actuator 225, e.g., an electric motor, to move, e.g., rotate, the excitation source 230 relative to the base 220. In an example, the rotational actuator 225 may rotate the excitation source 230 about an axis A1 perpendicular to the base 220 top 296, and may provide a 360-degree horizontal field of view of an area around the LIDAR sensor 130. In one example, the excitation source 230, the cover 210, and the window 215 may rotate about the axis A1. Alternatively, the LIDAR sensor 130 may lack a moving cover 210 and/or excitation source 230, i.e., the excitation source 230 may be stationary relative to the base 220. Additionally or alternatively, the vehicle 100 may include one or more sensors 130, e.g., a camera sensor 130, that is mounted to an interior, e.g., behind a vehicle 100 windshield, and/or to an exterior (e.g., reverse camera sensor 130 to a rear bumper).

In order to provide data, a window 215 of a LIDAR sensor 130 may allow the transmitted electro-magnetic beams and received reflections of the transmitted radiations to pass through the window 215. Various conditions may cause a window 215 blockage, e.g., attenuating (weakening) the transmitted radiations and/or reflections thereof when passing through the window 215. For example, an object detection operation of a LIDAR sensor 130 may be impaired upon a blockage of the LIDAR sensor 130 window 215. In one example, dirt, dust, etc., on an exterior surface of the LIDAR sensor 130 window 215 can cause a blockage of the LIDAR sensor 130. As another example, dirt, dust, etc. can cause a blockage of the camera sensor 130. The computer 110 may be programmed to activate a non-autonomous mode of the vehicle 100 upon determining that a LIDAR sensor 130, a camera sensor 130, etc. cannot provide object data, e.g., due to a blockage of the LIDAR sensor 130.

With reference to FIG. 2, the computer 110 may be programmed to actuate the fluid dispensers 240 to remove a blockage of the sensor(s) 130. The computer 110 may be programmed to actuate the fluid dispenser 240 in a "normal mode", i.e., dispensing air, e.g., via an air dispenser 240, and washer fluid, e.g., via a washer fluid dispenser 240, to clean the sensor 130 window 215. In another example, as discussed below concerning FIG. 3, the computer 110 may be programmed to actuate the fluid dispensers in an "air-only" mode, i.e., actuating the air dispenser 240 and simultaneously deactivating the washer fluid dispenser 240.

In one example, the air dispenser 240 may be directed to the window 215 and mounted to a cleaning arm. The air dispenser 240 may be fluidly coupled, e.g., via an air hose 270, to an air pressure source such as an electrical air blower, an air compressor, a compressed air capsule, etc. The computer 110 may be programmed to actuate an actuator 265 such as an electric solenoid valve, to open a flow of air to the air dispenser 240 via the air hose 270. Thus, the flow of air from the air dispenser 240 may remove dust, dirt, etc., from the window 215 surface.

In another example, the fluid dispenser 240 may be directed toward the window 215. The fluid dispenser 240 may spray washing fluid onto the window 215 surface. The fluid dispenser 240 may be fluidly connected via a fluid hose 275 to a fluid reservoir, e.g., a washer fluid container that supplies washer fluid to a vehicle 100 front and/or rear window. Additionally or alternatively, the vehicle 100 may include a fluid container disposed on the vehicle 100 roof. The computer 110 may be programmed to actuate a washer actuator 280, e.g., a wash pump, to spray washer fluid onto the window 215 surface. Additionally or alternatively, the computer 110 may be programmed to adjust the air flow and/or the fluid flow by actuating the actuator 265, 280 to partially open and/or close the flow of air and/or washer fluid.

Figure 3:
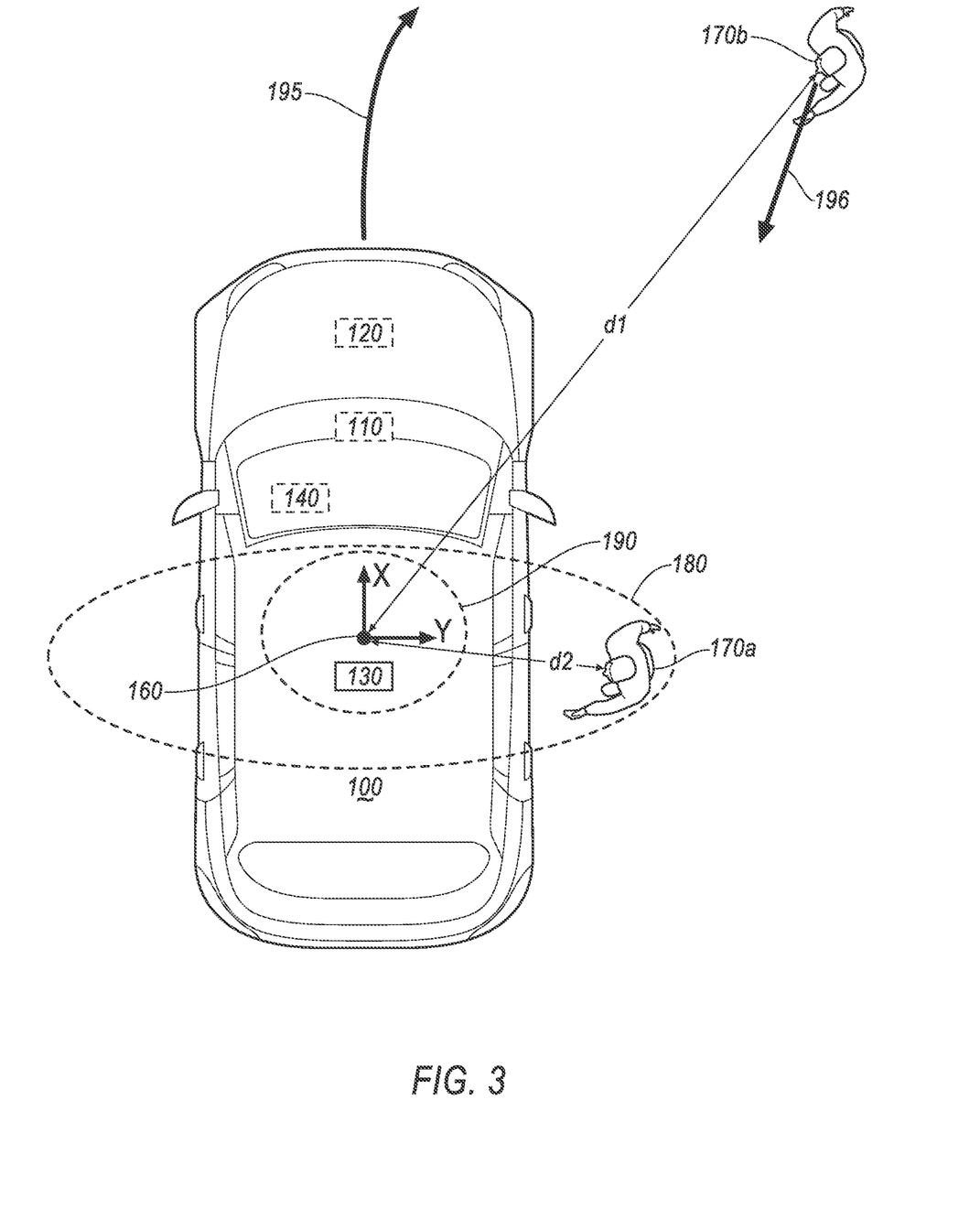
FIG. 3 is a diagram showing a top view of the vehicle of FIG. 1 and objects exterior to the vehicle.

With reference to FIG. 3, actuating the washer fluid dispenser 240 may splash washer fluid in a splash zone 180 around the vehicle 100. The splash zone 180 is an area in the exterior of the vehicle 100 that is sprayed by a washer liquid fluid upon actuation of the fluid dispenser 240. A shape and/or dimensions of the splash zone 180 may be based on fluid dispenser 240 nozzle shape, fluid pressure, vehicle 100 speed, wind speed and/or direction. In one example, the shape and/or dimensions of the splash zone 180 may be determined using fluid dynamic and/or aerodynamic calculation techniques. In another example, the shape and/or dimensions of the splash zone 180 may be determined using experimental techniques, e.g., using a wind tunnel. The vehicle 100 may be placed in a wind tunnel, the fluid dispenser 240 may be activated and the shape and/or dimensions of the splash zone 180 may be determined based on a shape and/or dimensions of an area on the ground surfaces that is wet by the washer fluid. Additionally, by applying various wind speed in the wind tunnel, a change of shape and/or dimensions of the splash zone 180 based on wind speed can be determined. Splashing washer fluid in the splash zone 180 may cause fluid to splash onto, e.g., a pedestrian object 170a present in the splash zone 180. The objects 170a, 170b may include pedestrians, motorcycles, bicycles, a convertible second vehicle, etc.

The computer 110 can be programmed to detect an object 170a, 170b exterior to the vehicle 100, and to actuate the fluid dispenser device 240 (or fluid dispenser 240) based on an opacity of a window, e.g., a sensor 130 window 215, and a location of the detected object 170a, 170b.

Opacity is a measure of the degree to which electromagnetic radiation such as the radiation emitted by the sensor 130 penetrates the window 215. An opacity may have a numeric value between 0% (zero) and 100%. Zero percent opacity may be associated with a transparent material, whereas 100% opacity may be associated with, e.g., a blocked window 215 that prevents a radiation from passing through the given medium. An increased opacity of the window 215, e.g., because of dust, dirt, etc., may impair sensor 130, e.g., the LIDAR sensor 130, the camera sensor 130, etc., operation. For example, the windows 215 covered with dirt may lack an ability to detect objects in the sensor 130 field of view. In one example, the computer 110 may be programmed to determine the opacity of the window 215 based on radiation received via the LIDAR sensor 130 electro-magnetic receiver. For example, the computer 110 may determine that the window 215 is blocked, e.g., when the window 215 opacity exceeds a predetermined threshold, e.g., 30%. In another example, the computer 110 may be programmed to determine that the window 215 is blocked upon determining that the window 215 opacity has been greater than the predetermined threshold for at least a predetermined minimum time duration, e.g., 5 seconds.

In the present disclosure, a "location" of an object 170a, 170b, is specified by location coordinates of the object 170a, 170b on a ground surface. The location coordinates may be specified in a two-dimensional Cartesian coordinate system including longitudinal and lateral coordinates X and Y having an origin, e.g., at the vehicle 100 reference point 160. The computer 110 may be programmed to determine the location of the objects 170a, 170b based on data received from the vehicle 100 sensors 130. Additionally or alternatively, the computer 110 may be programmed to determine the location of the object 170a, 170b based on global positioning system (GPS) data received from, e.g., a mobile device of a pedestrian object 170a, 170b. The computer 110 may be programmed to identify an object 170a, 170b based on data received from, e.g., a camera sensor 130, and a predetermined list of objects 170a, 170b types, e.g., a list including "pedestrian", "bicycle", etc. In other words, the computer 110 may be programmed to identify an object 170a, 170b based on data including the object 170a, 170b data from the sensor(s) 130 and the predetermined list including the type of the object 170a, 170b. For example, based on an example list of objects 170a, 170b type including "pedestrian" and "bicycle" only, the computer 110 may ignore a motorcycle by not identifying the motorcycle as an object 170a, 170b.

The computer 110 may be programmed to actuate the fluid dispenser 240 upon determining that the opacity of the window 215 exceeds a predetermined threshold. For example, the computer 110 may be programmed to periodically determine an opacity of the sensor 130 window 215 and to determine that the window 215 cleaning is warranted when the opacity of the window 215 exceeds a predetermined threshold, e.g., 30%.

The computer 110 may be programmed to actuate the fluid dispenser 240 to operate in the air-only mode upon determining that the location of the detected object 170a is within the splash zone 180. In other words, the computer 110 may be programmed to operate the fluid dispenser 240 in the air-only mode, e.g., by activating the air dispenser 240 and deactivating the washer fluid dispenser 240. The computer 110 may be programmed to determine whether the object 170a is within the splash zone 180 based on the determined location of the object 170a, 170b, the location of the vehicle 100, and the determined dimensions and/or shape of the splash zone 180.

Additionally, the computer 110 may be programmed to determine that an object, e.g., the object 170b, is expected to enter the splash zone 180 based on a distance $d_1$ of the object 170b to the vehicle 100 reference point 160, a speed and/or a movement direction 195 of the vehicle 100, and an expected duration of fluid dispenser 240 actuation, e.g., 5 seconds. Therefore, the computer 110 may be programmed to determine whether the object 170b is expected to enter the splash zone 180 (i.e., to be splashed) while the vehicle 100 moves in a movement direction 195 and the fluid dispenser 240 is actuated. The computer 110 may be programmed to determine the expected duration of the dispenser 240 actuation, e.g., based on a predetermined time, the determined opacity of the windows 215, etc. Additionally or alternatively, the computer 110 may be programmed to determine whether the object 170b enters the splash zone 180 based on speed and/or movement direction 196 of the object 170b, location of the object 170b, and the speed and location of the vehicle 100.

Upon determining that a location of the detected object 170b is outside a splash zone 180, the computer 110 may be programmed to actuate the fluid dispenser 240 in the normal mode. In another example, the computer 110 may be programmed to actuate the fluid dispenser 240 upon determining that the object 170b is outside the splash zone 180 and is not expected to enter the splash zone 180 during actuation of the fluid dispenser 240.

In some instances, splashing an object 170a, e.g., a pedestrian, may cause inconvenience, but may be necessary to prevent an impairment of a sensor 130 operation caused by an excessive opacity of the window 215. For example, the computer 110 may be programmed to ignore the location of the detected object 170a upon determining that the opacity of the window 215 exceeds a second threshold, e.g., 50%, greater than the first threshold, e.g., 30%.

As discussed above, the dimensions, area, and/or shape of the splash zone 180 may be based at least in part on a pressure of the washer fluid dispensed from the fluid dispenser 240. Thus, the splash zone 180 dimensions and/or shape may be modified to prevent splashing the object 170a. For example, the computer 110 may be programmed to determine an adjusted splash zone 190 of the fluid dispenser 240 based on the location of the detected object 170a such that the location of the detected object 170a is outside the adjusted splash zone 190 and to actuate the fluid dispenser 240 to operate according to the adjusted splash zone 190. For example, the computer 110 may be programmed to determine that the detected object 170a is within the splash zone 180, to determine the adjusted splash zone 190 based on, e.g., the distance $d_2$ of the object 170a relative to the vehicle 100 reference point 160, and to actuate the fluid dispenser 240 based on the determined adjusted splash zone 190. In one example, the computer 110 may be programmed to determine a circular-shaped adjusted splash zone 190 such that the distance $d_2$ is greater than a radius of the adjusted splash zone 190, i.e., the object 170a is located outside the adjusted splash zone 190.

A shape and/or dimensions of the splash zone 180 may change based on an intensity and/or a direction of wind. As discussed above, as an example, the vehicle 100 may be placed in a wind tunnel and by performing a wind test, i.e., applying various wind speeds and/or intensities, a change of the shape, area, and/or dimensions of the splash zone 180 can be determined. In one example, the computer 110 may be programmed to store wind test results in a computer 110 memory, e.g., in a table including applied wind speed and/or intensity and the associated test results, e.g., change(s) of shape, area, and/or dimensions of the splash zone 180. In one example, when the vehicle 100 is operated in the field, e.g., driving on a ground surface as shown in FIG. 3, the computer 110 may be programmed to determine a change of shape, area, dimensions of the splash zone 180 caused the wind based on the stored results of the wind test. Therefore, the computer 110 may be programmed to determine an adjusted splash zone 190 based on a wind intensity and a wind direction, and actuate the fluid dispenser 240 upon determining that the detected object 170a is outside the adjusted splash zone 190.

In some scenarios, a delayed actuation of fluid dispenser 240 may prevent splashing the object 170a, 170b, e.g., when the vehicle 100 passes by a pedestrian object 170a. The computer 110 may be programmed, upon determining that the opacity of the window 215 exceeds a first threshold, e.g., 30%, to determine a delay time, e.g., 3 seconds, based on a location of the detected object 170a, a vehicle 100 speed, and/or a vehicle 100 movement direction 195, and to actuate the fluid dispenser 240 after the determined delay time has ended. In another example, e.g., when a delay in actuation of the fluid dispenser 240 may impair the sensor 130 operation, the computer 110 may be programmed, upon determining that the opacity exceeds a second threshold, e.g., 50%, (greater than the first threshold, e.g., 30%) to actuate the fluid dispenser 240 without waiting for the determined delay time to end.

The computer 110 may be programmed to determine that the cleaning can be delayed based on vehicle 100 speed, vehicle 100 distance to other vehicles, data received via V-to-V communication interface, etc. For example, the computer 110 may be programmed to determine that the cleaning can be delayed upon determining that the vehicle 100 speed is less than a speed threshold, e.g., 30 kilometer per hour (kph).

Additionally or alternatively, the computer 110 may be programmed to determine that the cleaning can be delayed upon determining that a vehicle 100 distance to a nearest second vehicle is greater than a distance threshold, e.g., 200 meters. In other words, the vehicle 100 distance to a nearest second vehicle greater than the threshold may indicate a low likelihood of impact with other vehicles due to a temporary impairment of the vehicle 100 sensor(s) 130 which may be caused by the delayed cleaning.

Additionally or alternatively, the computer 110 may be programmed to determine that the cleaning can be delayed upon determining that a speed, direction, etc., of other vehicles is received via the V-to-V communication interface. Thus, the computer 110 may be programmed to navigate the vehicle 100 at least during a temporary impairment of the vehicle 100 sensor(s) 130 (caused by delayed cleaning) based on data received via the V-to-V communication interface.

In another example, the computer 110 may be programmed to determine whether the vehicle 100 can form a platoon with a second vehicle based on data received via the V-to-V communication interface including second vehicle location, speed, direction of movement, etc., and/or whether a second vehicle computer warrants a provision of sensor data and/or instruction to the vehicle 100. Thus, the computer 110 may be programmed to actuate the vehicle 100 to form a platoon with a second vehicle upon determining that the opacity of the window 215 exceeds a threshold, e.g., 50%, and that a location of the detected object 170a, is within a splash zone 180 of the fluid dispenser, and to navigate the vehicle 100 based on data received from the second vehicle. "Forming a platoon" may include actuating one or more of the vehicle 100 actuators 120 such as acceleration, steering, and/or braking actuators 120 based on the data received from the second vehicle, e.g., object 170a, 170b data and second vehicle location data.

Processing

Figure 4A:
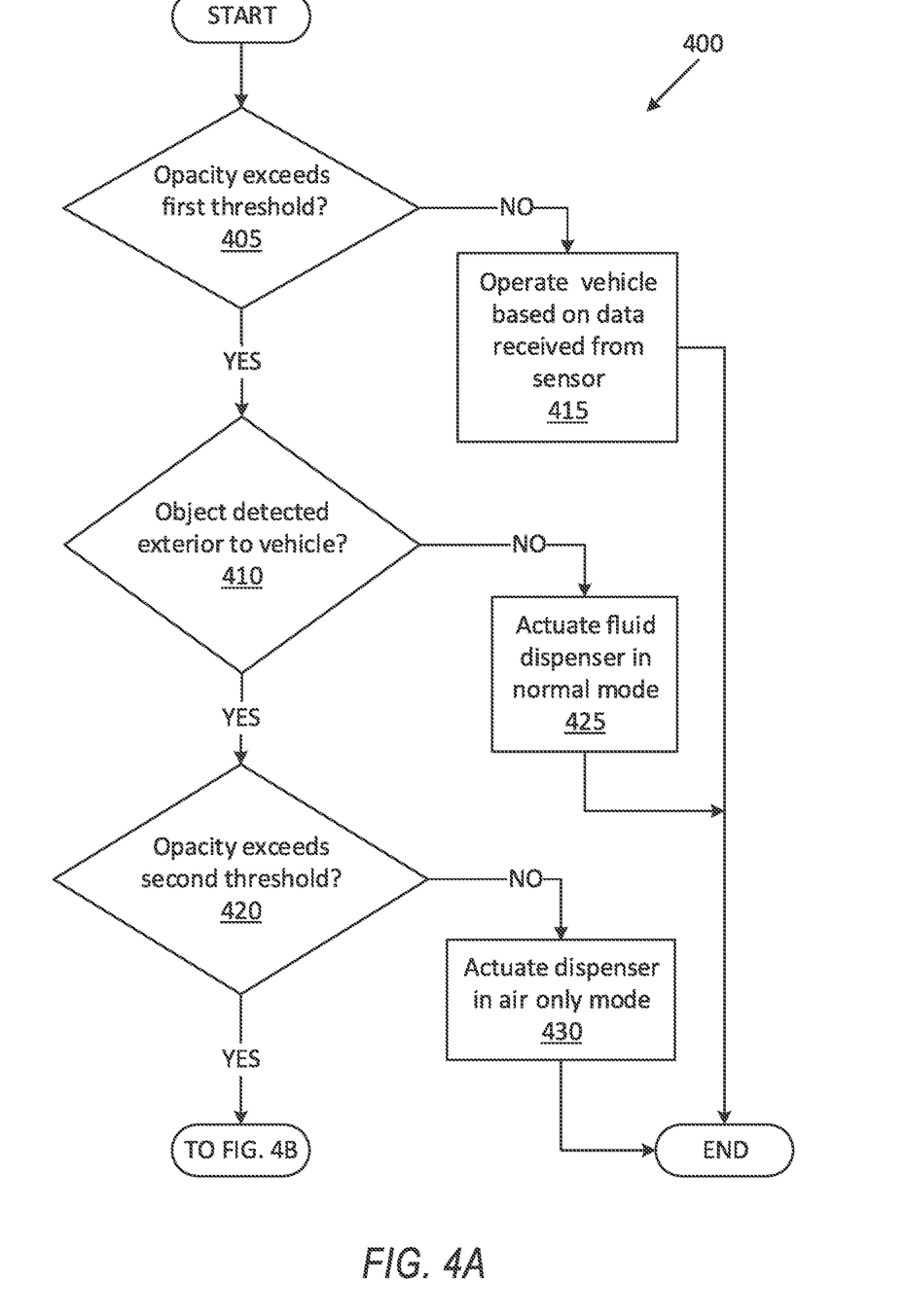
FIGS. 4A-4C are a flowchart of an exemplary process for operating the fluid dispenser(s).
Figure 4B:
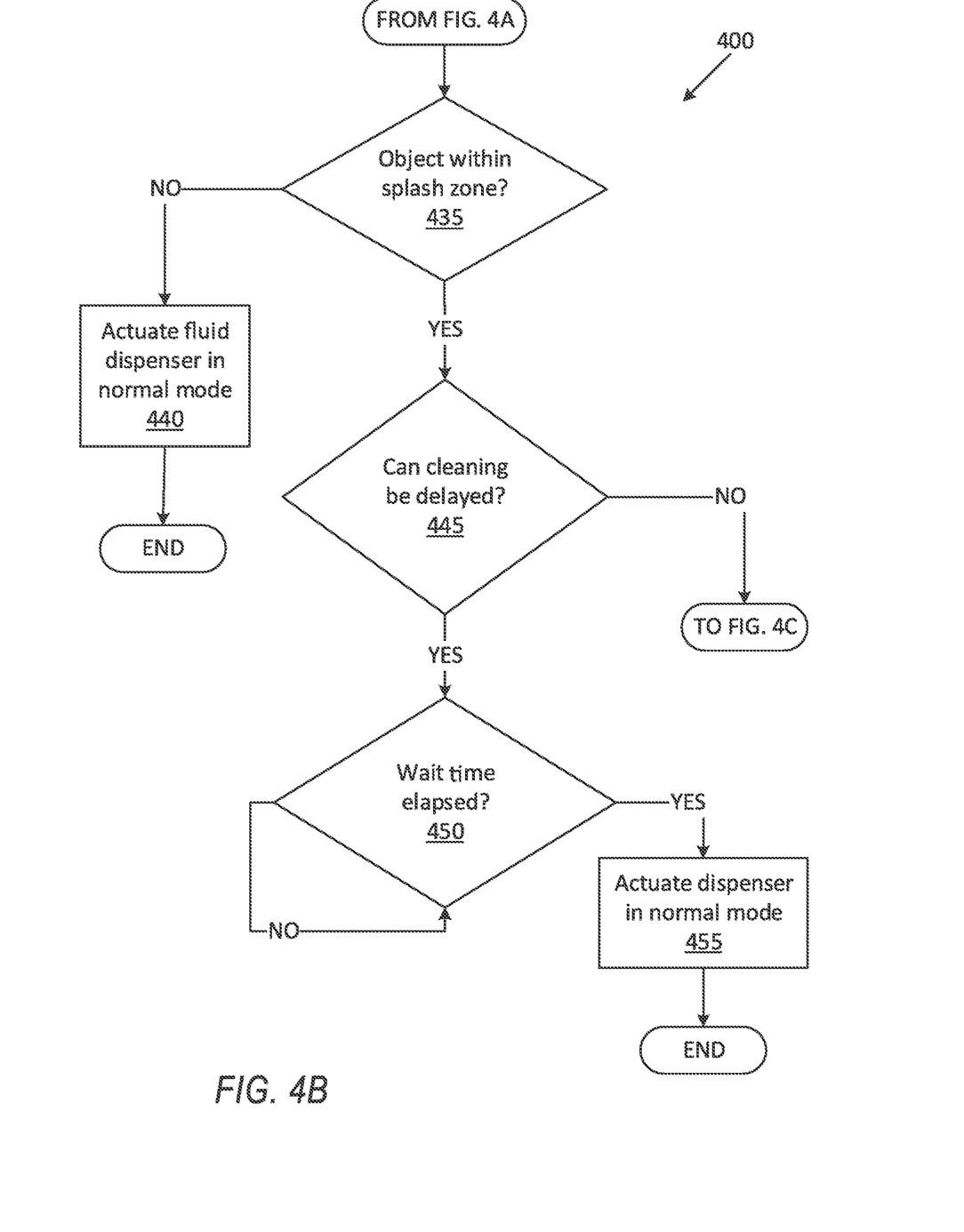
Figure 4C:
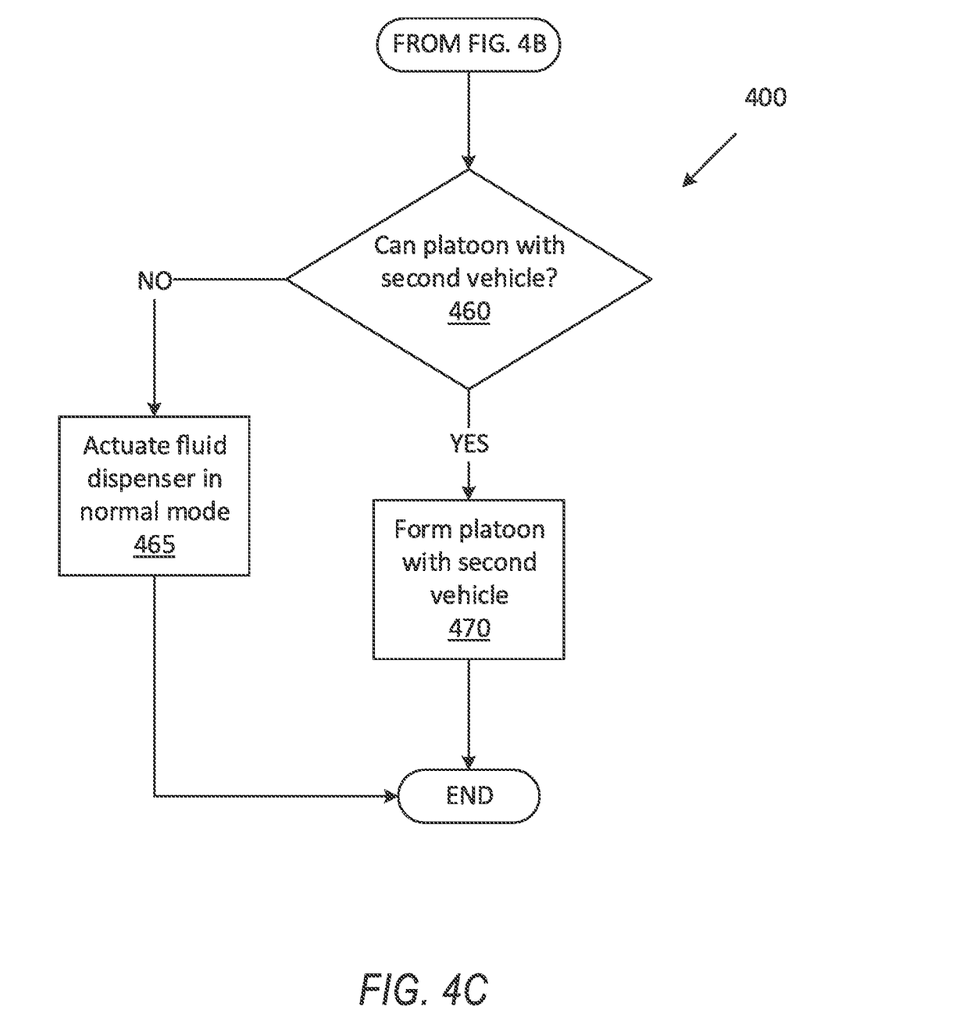

FIGS. 4A-4C collectively illustrate a flowchart of an exemplary process 400 for operating the fluid dispenser(s). The vehicle 100 computer 110 may be programmed to execute blocks of the process 400.

As shown in FIG. 4A, the process 400 begins in a decision block 405, in which the computer 110 determines whether the opacity, e.g., of the windows 215, exceeds a predetermined first threshold, e.g., 30%. If the computer 110 determines that the opacity exceeds the first threshold, then the process 400 proceeds to a decision block 410; otherwise the process 400 proceeds to a block 415.

In the decision block 410, the computer 110 determines whether an object 170a, 170b is detected exterior to the vehicle 100. The compute 110 may be programmed to detect, e.g., a pedestrian object 170a, 170b exterior to the vehicle 100 based on data received from the vehicle 100 sensors 130. Additionally, the computer 110 may be programmed to detect the objects 170a, 170b based on a predetermined list of objects 170a, 170b such as "pedestrian", "bicycles", etc. If the computer 110 detects an object 170a, 170b exterior to the vehicle 100, the process 400 proceeds to a decision block 420; otherwise the process 400 proceeds to a block 425.

In the block 415, the computer 110 operates the vehicle 100 based on data received from the sensor(s) 130. The computer 110 may be programmed to actuate a vehicle 100 propulsion, steering, and/or braking based on, e.g., object data received from the LIDAR sensor 130. Following the block 415, the process 400 ends, or alternatively returns to the decision block 405.

In the decision block 420, the computer 110 determines whether the determined opacity exceeds a second threshold, e.g., 50%. If the computer 110 determines that the opacity exceeds the second threshold, then the process 400 proceeds to a decision block 435 (see FIG. 4B); otherwise the process 400 proceeds to a block 430.

In the block 425, the computer 110 actuates the fluid dispenser 240 in the normal mode. For example, the computer 110 may be programmed to operate the air dispenser 240 and the washer fluid dispenser 240 with the splash zone 180. Following the block 425, the process 400 ends, or alternatively returns to the decision block 405.

In the block 430, the computer 110 actuates the fluid dispenser 240 to operate in the air-only mode, e.g., by actuating the air dispenser 240 to operate and deactivating the washer fluid dispenser 240.

Following the block 430, the process 400 ends, or alternatively returns to the decision block 405.

With reference to FIG. 4B, in the decision block 435, the computer 110 determines whether the detected object 170a, 170b is in the splash zone 180. The computer 110 may be programmed to determine whether the detected object 170a, 170b is in the splash zone 180 based on the vehicle 100 location, the object 170a, 170b location, and/or the dimensions and shape of the splash zone 180, e.g., using known techniques such as ultrasound, LIDAR, etc. Additionally or alternatively, the computer 110 may be programmed to determine whether the detected object 170a, 170b is expected to enter the splash zone 180 based on based on the shape and dimensions of the splash zone 180, location and/or movement direction of the vehicle 100, location and/or movement direction of the detected object 170a, 170b, a wind direction and/or speed, and/or an expected duration of actuating the fluid dispenser 240. If the computer 110 determines that the detected object 170a, 170b is within the splash zone 180 (or is expected to enter the splash zone 180), the process 400 proceeds to a decision block 445; otherwise the process 400 proceeds to a block 440.

In the block 440, the computer 110 actuates the fluid dispenser 240 in the normal mode of operation. Following the block 440, the process 400 ends, or alternatively returns to the decision block 405.

In the decision block 445, the computer 110 determines whether cleaning of the window 215 can be delayed. For example, the computer 110 may be programmed to determine that the cleaning can be delayed based on vehicle 100 speed, vehicle 100 distance to other vehicles, data received via V-to-V communication interface, etc. If the computer 110 determines that the cleaning can be delayed, e.g., for a wait time of 3 seconds, then the process 400 proceeds to a decision block 450; otherwise the process 400 proceeds to a decision block 460 (see FIG. 4C).

In the decision block 450, the computer 110 determines whether the wait time, e.g., 3 seconds, has elapsed since the transition from the decision block 445 to the decision block 450. If the computer 110 determines that the wait time has elapsed, the process 400 proceeds to a block 455; otherwise the process 400 returns to the decision block 450.

In the block 455, the computer 110 actuates the fluid dispenser 240 in the normal mode of operation. Following the block 455, the process 400 ends, or alternatively returns to the decision block 405.

With reference to FIG. 4C, in the decision block 460, the computer 110 determines whether the vehicle 100 can form a platoon with a second vehicle. If the computer 110 determines that a platoon can be formed with the second vehicle, the process 400 proceeds to a block 470; otherwise the process 400 proceeds to a block 465.

In the block 465, the computer 110 actuates the fluid dispenser 240 in the normal mode of operation. Following the block 465, the process 400 ends, or alternatively returns to the decision block 405.

In the block 470, the computer 110 forms a platoon with the second vehicle and operates the vehicle 100 based at least in part on data received from the second vehicle. The computer 110 may be programmed to actuate a vehicle 100 propulsion, steering, and/or braking based on, e.g., object data received from the LIDAR sensor 130 of the second vehicle. Following the block 470, the process 400 ends, or alternatively returns to the decision block 405.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   detect an object exterior to a vehicle;
   upon determining that the location of the detected object is outside a splash zone of fluid dispenser, actuate a fluid dispenser device based on an opacity of a window and a location of the detected object, wherein the splash zone is an area in the exterior of the vehicle that is sprayed by a dispenser liquid fluid upon actuation of the fluid dispenser; and
   upon determining that the location of the detected object is within the splash zone, actuate the fluid dispenser to output only air.

2. The system of claim 1, wherein the detected object is a pedestrian.

3. The system of claim 1, wherein the window is a vehicle sensor window.

4. The system of claim 1, wherein the instructions include further instructions to actuate the fluid dispenser upon determining that the opacity of the window exceeds a first threshold.

5. The system of claim 4, wherein the instructions include further instructions to ignore the location of the detected object upon determining that the opacity of the window exceeds a second threshold greater than the first threshold.

6. The system of claim 1, wherein the instructions include further instructions to:
   determine an adjusted splash zone based on a wind intensity and a wind direction; and
   actuate the fluid dispenser upon determining that the detected object is outside the adjusted splash zone.

7. The system of claim 1, wherein the instructions include further instructions to:
   determine an adjusted splash zone of the fluid dispenser based on the location of the detected object, wherein the location of the detected object is outside the adjusted splash zone, and
   actuate the fluid dispenser to operate according to the adjusted splash zone.

8. The system of claim 1, wherein the instructions include further instructions to:
   upon determining that the opacity of the window exceeds a first threshold, determine a delay time based on at least one of the location of the detected object, a vehicle speed, and a vehicle movement direction; and
   actuate the fluid dispenser after the determined delay time has ended.

9. The system of claim 8, wherein the instructions include further instructions to actuate the fluid dispenser without waiting for the determined delay time to end, only upon determining that the opacity exceeds a second threshold greater than the first threshold.

10. The system of claim 1, wherein the instructions include further instructions to:
    actuate the vehicle to platoon with a second vehicle upon determining that the opacity of the window exceeds a threshold and that the location of the detected object is within a splash zone of the fluid dispenser; and
    navigate the vehicle at least in part based on data received from the second vehicle.

11. A method, comprising:
    detecting an object exterior to a vehicle;
    determining that the location of the detected object is outside a splash zone of fluid dispenser;
    actuating a fluid dispenser device based on an opacity of a window and a location of the detected object, wherein the splash zone is an area in the exterior of the vehicle that is sprayed by a dispenser liquid fluid upon actuation of the fluid dispenser;
    determining that the location of the detected object is within the splash zone; and
    actuate the fluid dispenser to output only air.

12. The method of claim 11, wherein the detected object is a pedestrian.

13. The method of claim 11, further comprising actuating the fluid dispenser upon determining that the opacity of the window exceeds a first threshold.

14. The method of claim 11, further comprising:
determining an adjusted splash zone based on a wind intensity and a wind direction; and
actuating the fluid dispenser upon determining that the detected object is outside the adjusted splash zone.

15. The method of claim 11, further comprising:
determining an adjusted splash zone of the fluid dispenser based on the location of the detected object, wherein the location of the detected object is outside the adjusted splash zone, and
actuating the fluid dispenser to operate according to the adjusted splash zone.

16. The method of claim 11, further comprising:
upon determining that the opacity of the window exceeds a first threshold, determining a delay time based on at least one of the location of the detected object, a vehicle speed, and a vehicle movement direction; and
actuating the fluid dispenser after the determined delay time has ended.

17. The method of claim 11, further comprising:
actuating the vehicle to platoon with a second vehicle upon determining that the opacity of the window exceeds a threshold and that the location of the detected object is within a splash zone of the fluid dispenser; and
navigating the vehicle at least in part based on data received from the second vehicle.

* * * * *